United States Patent [19]

Satou et al.

[11] Patent Number: 5,017,195

[45] Date of Patent: May 21, 1991

[54] NON-DUSTABLE GRANULAR DYE: DYE PARTICLES COATED WITH HYDROXYLPROPYL CELLULOSE OR CARBOHYDRATE

[75] Inventors: Fumitaka Satou, Urawa; Fumio Ogawa, Oomiya, both of Japan

[73] Assignee: Nippon Kayaku Kabushiki Kaisha, Tokyo, Japan

[21] Appl. No.: 315,688

[22] PCT Filed: Jun. 23, 1988

[86] PCT No.: PCT/JP88/00625

§ 371 Date: Mar. 17, 1989

§ 102(e) Date: Mar. 17, 1989

[87] PCT Pub. No.: WO89/00183

PCT Pub. Date: Jan. 12, 1989

[30] Foreign Application Priority Data

Jul. 1, 1987 [JP] Japan ................. 62-162384

[51] Int. Cl.⁵ ............................. C09B 67/08
[52] U.S. Cl. ........................... 8/526; 8/543; 8/561; 8/562; 8/680
[58] Field of Search ............ 8/526, 561, 562

[56] References Cited

U.S. PATENT DOCUMENTS

| 2,897,121 | 7/1959 | Wagner | 428/497 |
| 3,069,370 | 12/1962 | Jensen et al. | 523/200 |
| 3,872,023 | 3/1975 | Baum et al. | 8/526 |
| 4,244,836 | 1/1981 | Frewsch et al. | 8/526 |
| 4,269,729 | 5/1981 | Maruyama et al. | 8/526 |
| 4,286,959 | 9/1981 | Horn et al. | 8/526 |
| 4,722,736 | 2/1988 | Hull | 8/526 |
| 4,961,755 | 10/1990 | Bruttel | 8/526 |

FOREIGN PATENT DOCUMENTS 323407  7/1989  European Pat. Off. .
37-12379  8/1962  Japan .
49-48073 12/1974  Japan .

Primary Examiner—A. Lionel Clingman
Attorney, Agent, or Firm—Henry C. Nields

[57] ABSTRACT

A non-dustable granular dye comprising dye particles in granular form coated with a coating agent selected from the group consisting of a water-soluble high-molecular weight substance, a monosaccharide and an oligosaccharide.

6 Claims, No Drawings

NON-DUSTABLE GRANULAR DYE: DYE PARTICLES COATED WITH HYDROXYLPROPYL CELLULOSE OR CARBOHYDRATE

TECHNICAL FIELD

The present invention relates to a dye having a specified form. More particularly, the invention relates to a non-dustable granular dye coated with a specified chemical agent.

BACKGROUND ART

Dyes have hitherto been commercialized in a wet state such as liquids, pastes, etc. or in a dry state such as grains, powders, etc. Particularly, those dyes which are difficult to convert into liquids or pastes because of decomposition or the like in a wet state, such as reactive dyes, have been commercialized mainly in a dry form. Powdery dyes, however, are liable to generate the problem of flying away, or dusting, when being handles, with the result of adhesion to equipment or the workers, thereby worsening work environment. To obviate the worsening of the work environment, it is inevitable to make a great investment in plant and a great deal of labor for dust collector, dust-proof clothing, cleaning of equipment, etc. Furthermore, the powdery dyes tend to cause dusting also at the time of weighing, with the result of contamination of the workers or equipment, thereby leading to sanitary problems, economic loss associated with cleaning, and so on. To improve the defects of the powdery dyes, there has been attempted granulation, typically graining, of the dyes. The granular dyes thus obtained, however, have also the problem of dusting due to collapse of the particles during transportation, weighing, dissolution or the like thereof. Besides, for the progress of automation of handling of the dyes, such as automatic packing and automatic weighing, it has been requested to develop a form of dye suitable for the automation of handling.

DISCLOSURE OF INVENTION

As a result of the present inventors' studies for solving the above-mentioned problems, it has been found that when an ordinary granular dye obtained by granulation of a dye together with a binder is coated with a specified chemical agent, it is possible to obtain dye particles which have an extremely low possibility of dusting, no possibility of polluting work environment, and high adaptability to the automation of handling of the dye. Based on the finding, the present inventors have completed the invention.

According to the present invention, there is provided a non-dustable granular dye obtained by coating the particles of a granular dye with a coating agent selected from the group consisting of water-soluble high molecular substances, monosaccharides and oligosaccharides.

BEST MODE FOR CARRYING OUT THE INVENTION

The dye for use in the present invention may be any kind of dye which can be made into a granular form, for instance, commercially available dyes such as disperse, cationic, acid, reactive, direct, sulphur and fluorescent dyes, more specific examples being found in Color Index (3rd Ed.), etc.

The method of making dye into a granular form may be either a dry granulation process or a wet granulation process. Ordinarily, a wet granulation process as described below is used. The wet granulation process comprises the steps of adding 0 to 2 parts by weight of a binder and 20 to 40 parts by weight of water to 100 parts by weight of the above-mentioned dye, kneading the resultant admixture, then simultaneously performing shaping and drying by a spray dryer, or once shaping the kneaded admixture into a specified form by a granulating machine followed by drying at 50° to 130° C., and thereafter subjecting the granular dye to screening by sieving to obtain the granular dye having a predetermined particle diameter.

The binder mentioned above may be a water-soluble high molecular-weight substance such as starch, dextrin, sodium alginate, gelatine, carboxymethyl cellulose, hydroxypropyl cellulose, polyvinyl alcohol, sodium acrylate, polyvinyl pyrrolidone, etc., a monosaccharide such as glucose, fructose, etc., or an oligosaccharide such as sucrose, lactose, etc. Two or more of these substances may be used in combination, and it is convenient to add the binder to the dye in the state of a 1-10% (by weight) aqueous solution.

A method may also be used which comprises mixing a powdery dye into an aqueous binder solution adjusted to a concentration of 1 to 10%, forming the resultant mixture into irregularly shaped particles (conglomerates), then drying the particles, and subjecting the dried particles to screening by sieving to obtain predetermined particles.

In forming the granular dye, additives usually added in preparation of a dye bath, such as salt cake, common salt, surface active agent, etc., may be added, as required. In the case of a water-insoluble dye such as a disperse dye, the dye is subjected to pulverization before granulation. The shape of the particles into which the dye is to be formed may be arbitrarily selected, for instance, spherical, spheroidal or cylindrical, but it is convenient to form the dye into cylindrical granules by a granulating machine, from the viewpoint of working efficiency. As for the size of the granule, the length is ordinarily 0.2 to 5 mm, preferably 0.5 to 2 mm, and the diameter is ordinarily 0.5 to 2 mm, preferably 0.8 to 1.5 mm. In the case of forming by use of a spray dryer, it is preferable to form the dye into substantially spherical particles of 0.1 to 0.4 mm in diameter.

Coating of the granular dye thus formed is carried out, for instance, as follows. A coating agent is dissolved in water, an organic solvent or a mixture thereof. The thus obtained liquid (for instance, a 1-20% by weight solution) is sprayed while blowing hot air at 40° to 100° C. by use of a pan-type, fluidized bed type, drum type or other coating machine to coat the particles of the granular dye so that 100 parts by weight of the granular dye (dye particles) will be coated with 0.1 to 5 parts by weight of the coating agent.

The coating agent mentioned above may be a water-soluble high molecular-weight substance such as sodium alginate, gelatine, carboxymethyl cellulose, hydroxypropyl cellulose, starch, dextrin, polyvinyl alcohol, sodium acrylate, polyvinyl pyrrolidone, etc., a monosaccharide such as glucose, fructose, etc., or an oligosaccharide such as sucrose, lactose, etc. Two or more these substances may be used in combination. As the organic solvent mentioned above, one which is easily evaporable is preferably used, and an alcohol such as methyl alcohol, ethyl alcohol, etc. is particularly preferred.

When the non-dustable granular dye obtained according to the present invention is dissolved in water, followed by addition of salt cake, common salt, surface active agent or the like, as required, to prepare a dye bath and dyeing of fibers is carried out under predetermined dyeing conditions (temperature, time, etc.), it is possible to obtain a dyed product having dyeing characteristics and fastness comparable to those of a dyed product obtained by use of a conventional powdery dye.

The non-dustable granular dye of the present invention, obtained by coating of the granularly formed dye (dye particles), is excellent in dustlessness, has a rate of powder generation, indicative of the strength of the particles, of not more than about 1%, is free of dusting during handling thereof, and is free of possibility of polluting equipment, the workers or the like through adhesion of the dye. Therefore, the dye of the invention is favorable from a sanitary point of view. Besides, the non-dustable granular dye of the present invention is excellent in fluidity because of its granular form, and is capable of being weighed accurately and speedily even by a simple automatic weighing system. Thus, the dye of the present invention is sufficiently suitable for automatic handling, such as automatic packing and automatic color conditioning. Moreover, the granular dye according to the present invention is less susceptible to collapse of the dye particles as compared to a conventionally known, simply granulated dye; therefore, the dye of the present invention maintains the effect on prevention of dusting as well as the suitability to automatic handling, for a long time.

EXAMPLES

The present invention will now be described more in detail while referring to the following examples, in which the term "parts" means "parts by weight" and "%" means "% by weight".

EXAMPLE 1

One hundred parts of a powdery reactive dye of the following formula (1) (Color Index Reactive Red 217) was kneaded with 5 parts of 1% sodium alginate and 24 parts of water, and the kneaded mixture was granulated by an extrusion granulating machine with a screen aperture diameter of 1.0 mm. The granulated mixture was then dried at 70° to 80° C, and subjected to screening by sieving to obtain cylindrical granules of the reactive dye (about 1 mm in diameter and about 0.5 to 2.5 mm in length).

Then, 100 parts of the granular dye was put into a pan-type coating machine, which was rotated at 20 r.p.m. and hot air of 60° to 70° C. was blown. To the granules being rotated, 8 parts of a 20% sucrose solution (consisting of 20 parts of sucrose, 30 parts of water and 50 parts of ethyl alcohol) was sprayed over about 10 minutes to perform coating. The coating gave a non-dustable granular dye according to the present invention coated with 1.6% of sucrose.

COMPARATIVE EXAMPLE 1-1

The powdery reactive dye used in Example 1.

COMPARATIVE EXAMPLE 1-2

The uncoated cylindrical granules of the reactive dye, obtained in Example 1.

EXAMPLE 2

A mixing and stirring type granulating machine was charged with 100 parts of a powdery direct dye (Color Index Direct Red 224), and was rotated at 2,800 r.p.m. Into the granulating machine being rotated, 50 parts of a 1% aqueous solution of polyvinyl alcohol was poured over about 5 minutes, to obtain conglomerate-like granules. The granules were dried at 100° C., and subjected to sieving to obtain granules 0.5 to 2 mm in major length.

Then, 100 parts of the granular dye thus obtained was put into a drum-type coating machine, which was rotated at 150 r.p.m. and hot air of 70° to 80° C. was blown. To the granular dye being rotated, 15 parts of a 10% polyvinyl pyrrolidone solution (consisting of 10 parts of polyvinyl pyrrolidone and 90 parts of ethyl alcohol) was sprayed over about 20 minutes to perform coating. The coating gave a non-dustable granular dye according to the present invention coated with 1.5% of polyvinyl pyrrolidone.

COMPARATIVE EXAMPLE 2-1

The powdery direct dye used in Example 2.

COMPARATIVE EXAMPLE 2-2

The uncoated conglomerate-like granules of the direct dye, obtained in Example 2.

EXAMPLE 3

One hundred parts of a disperse dye (Color Index Disperse Blue 259) pulverized by use of a powdery dispersant was kneaded with 15 parts of water. The kneaded mixture was immediately granulated by an extrusion granulating machine with a screen aperture diameter of 1.0 mm, followed by drying at 60° to 70° C. and sieving, to obtain cylindrical granules of the disperse dye (about 1.0 mm in diameter and about 0.5 to 2.5 mm in length).

Then, 100 parts of the cylindrical granular dye was put into a pan-type coating machine, which was rotated

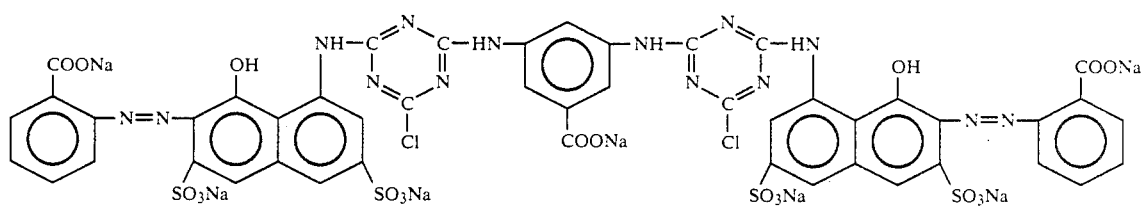

(1)

at 20 r.p.m. and hot air of 60° to 70° C. was blown. To the granular dye being rotated, 10 parts of a 2% hydroxypropyl cellulose solution (consisting of 2 parts of hydroxypropyl cellulose and 98 parts of ethyl alcohol) was sprayed over about 10 minutes to perform coating. The coating gave a non-dustable granular dye according to the present invention coated with 0.2% of hydroxypropyl cellulose.

COMPARATIVE EXAMPLE 3-1

The powdery disperse dye used in Example 3.

COMPARATIVE EXAMPLE 3-2

The uncoated cylindrical granules of the disperse dye, obtained in Example 3.

EXAMPLE 4

A non-dustable granular dye according to the present invention was obtained in the same manner as in Example 1 except that granulation by the granulating machine was carried out by using 10 parts of a 2% aqueous solution of polyvinyl alcohol and 20 parts of water in place of 5 parts of the 1% aqueous solution of sodium alginate and 24 parts of water which were used in Example 1, and 10 parts of a 2% hydroxypropyl cellulose solution was used as a coating agent in place of 8 parts of the 20% sucrose solution used in Example 1.

COMPARATIVE EXAMPLE 4

The uncoated cylindrical granules of the reactive dye, obtained in Example 4.

EXAMPLE 5

To 100 parts of a press cake form of fluorescent dye (Color Index No. F-24) was added 40 parts of a 15% brine, and the resultant admixture was kneaded to obtain a slurry. The slurry was subjected to simultaneous forming and drying by a spray dryer with an inlet temperature of 180° C., followed by sieving to obtain spherical granules of the fluorescent dye (about 0.1 to 0.4 mm in diameter).

Then, 100 parts of the granular dye was put into a flow type coating machine, into which hot air of 60° to 70° C. was blown from the bottom thereof. To the granules being thus fluidized, 10 parts of a 2% aqueous solution of polyvinyl alcohol (consisting of 2 parts of polyvinyl alcohol and 98 parts of water) was sprayed over about 20 minutes to perform coating. The coating gave a non-dustable granular dye according to the present invention coated with 0.2% of polyvinyl alcohol.

COMPARATIVE EXAMPLE 5

The uncoated spherical granules of the fluorescent dye, obtained in Example 5.

EXAMPLE 6

One hundred parts of a reactive dye of the following formula (2):

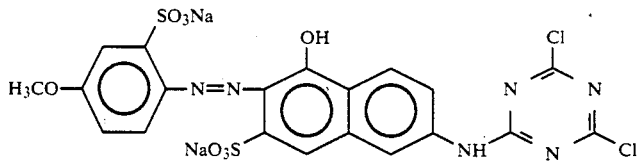

(2)

was kneaded with 5 parts of 1% sodium alginate and 24 parts of water, and the kneaded mixture was granulated by an extrusion granulating machine with a screen aperture diameter of 1.2 mm. The granulated mixture was then dried at 50° to 60° C., and subjected to sieving to obtain cylindrical granules of the reactive dye of about 1.2 mm in diameter and 0.5 to 2.5 mm in length.

Then, 100 parts of the cylindrical granular dye was put into a pan-type coating machine, which was rotated at 20 r.p.m. and hot air of 50° to 60° C. was blown into the coating machine. To the granular dye being rotated, 100 parts of a 1% starch solution (consisting of 1 part of starch, 40 parts of water and 59 parts of ethanol) was sprayed over about 10 minutes to perform coating. The coating gave a non-dustable granular dye of the reactive dye coated with about 1% of starch.

APPLICATION EXAMPLE

An aqueous dye solution of 1 part of the non-dustable granular dye of the present invention obtained in Example 1 in 20 parts of water was poured into 200 parts of water of 40° to 50° C. containing 20 parts of cotton fibers immersed therein, then 10 parts of salt cake was added thereto, and 5 parts of soda ash was added thereto as an alkali agent, to prepare a dye bath.

The dye bath was then heated to 80° C. over 30 minutes, and was stirred at that temperature for 60 minutes.

The cotton was then taken out, and washed with 100 parts of water and then with 100 parts of hot water of 50° C. The thus dyed cotton was immersed in a solution of 3 parts of a surface active agent in 100 parts of water of 95° C., followed by stirring for 20 minutes. The thus treated cotton was then washed again with 100 parts of water sufficiently, and dried.

As a result, a red dyed product was obtained which had the same dyeing characteristics and fastness as those of a product dyed with a conventional powdery dye.

COMPARATIVE TESTS

The non-dustable granular dyes of the present invention obtained in Examples 1 to 5 as well as the powdery dyes and the uncoated granular dyes obtained in Comparative Examples 1 to 5 were compared with each other in respect of dustlessness and the strength of particles (rate of powder generation). The fluidity (compressibility and angle of repose) of the dyes was also measured. The results are shown in Table 1.

TABLE 1

| Example or Comparative Example | Dustless-ness | Strength of particles (Rate of powder generation) | Fluidity | |
|---|---|---|---|---|
| | | | Compressi-bility | Angle of repose |
| Example 1 | 4–5 | 0.2% | 7% | 35° |
| Comp. Ex. 1-1 | 2–3 | — | 41% | 49° |
| Comp. Ex. 1-2 | 2 | 0.6% | 8% | 36° |
| Example 2 | 4–5 | 0.5% | 8% | 36° |
| Comp. Ex. 2-1 | 2–3 | — | 45% | 52° |
| Comp. Ex. 2-2 | 1–2 | 10.8% | 10% | 39° |
| Example 3 | 5 | 0.8% | 5% | 35° |
| Comp. Ex. 3-1 | 2–3 | — | 35% | 45° |
| Comp. Ex. 3-2 | 3 | 2.3% | 6% | 35° |
| Example 4 | 4–5 | 0.2% | 6% | 33° |
| Comp. Ex. 4 | 2 | 0.6% | 8% | 35° |
| Example 5 | 5 | 0.2% | 10% | 30° |
| Comp. Ex. 5 | 3 | 1.0% | 12% | 32° |

Note 1: Dustlessness

A funnel was placed at an upper inlet to a tubular cylinder and a circular filter paper wet with water was set to a predetermined position of the funnel stem in the cylinder.

Ten grams of each dye was dropped into the cylinder along the wall of the funnel over 1 minute. After leaving the thus dropped dye to stand still for 3 minutes, the amount of the dye which had flown up to adhere to the filter paper was visually evaluated.

The rating of the dustlessness (the degree of contamination of the filter paper) was represented by grades 5, 4, 3, 2 and 1, defined as follows: grade 5 (filter paper is little contaminated), grade 4 (colored spots are present but none of them overlap each other), grade 3 (many colored spots are present and some of them overlap each other), grade 2 (filter paper is considerably colored), and grade 1 (filter paper is heavily colored).

Note 2: Strength of particles (Rate of powder generation)

Fifty grams of each granular dye of 20 to 60 mesh was placed in a 200-ml cylindrical tube, which was rotated at 30 r.p.m. for 15 minutes, and then the percentage of the amount of powder passing through a 60 mesh sieve was determined as the rate of powder generation.

The results of the above comparative tests show that the non-dustable granular dyes of the present invention are superior in dustlessness and lower in the rate of powder generation, as compared with dyes in conventional forms. This was also supported by the result of microscopic observation, which showed the presence of considerable amounts of the powdery dye on the surfaces of uncoated particles of the conventional granular dye.

The fluidity of the granular dyes was determined as follows.

Note 3: Compressibility

A tubular cylinder (150 ml) was charged slowly with 100 ml of the dye, and the initial bulk density of the dye was calculated through weight measurement. Then, a tapping operation was repeated until the volume of the dye in the cylinder became constant, and the constant-volume bulk density of the dye was calculated.

The compressibility was calculated according to the following formula:

$$[(\text{constant-volume bulk density}) - (\text{initial bulk density})] \div (\text{constant-volume bulk density}) \times 100 = \text{compressibility (\%)}$$

It is said that a compressibility of not less than 20% causes a clogging phenomenon due to bridging in a storage tank or the like, and it is desirable that the granular dye has a compressibility of not more than about 10%.

Note 4: Angle of repose

The dye was permitted to flow down through a funnel into the inside of each of various-sized base rings (diameter: D mm), and the height (H mm) of the conical heap of the dye was measured when the dye was just about to flow over the ring. The results were plotted on a section paper, with the height (H) on the ordinate and the radius (D/2 mm) of the ring on the abscissa, to obtain a straight line representing a linear relationship. The angle of repose was represented by the angle of slope of the straight line.

It is said that it is preferable for a powdery or granular material to have an angle of repose of 30° to 40°, in order to show favorable fluidity.

The results of the above comparative tests show that the non-dustable granular dye of the present invention is excellent in dustlessness and has a low rate of powder generation, and, accordingly, the non-dustable granular dye of the present invention will not cause environmental pollution through dusting and is highly suitable for automatic handling of the dye.

Besides, the coating of the dye has little effect on the fluidity of the dye, and the coated granular dye is slightly superior to an uncoated granular dye in fluidity, as seen from the results of measurement of the compressibility and the angle of repose. This fact indicates that collapse of the particles of the granular dye is substantially not caused in the coating process.

INDUSTRIAL APPLICABILITY

The non-dustable granular dye according to the present invention has a low possibility of dusting and is highly suitable for automation of dye-handling operations such as transportation, weighing, dissolution, etc., and, therefore, has an extremely high potentiality for use in dye-manufacturing, dyeing and other industries.

What is claimed is:

1. A non-dustable granular dye composition which comprises dye particles in granular form coated with a monosaccharide, an oligosaccharide or hydroxypropyl cellulose.

2. The non-dustable granular dye composition according to claim 1, wherein the oligosaccharide in sucrose.

3. A process for producing a non-dustable granular dye composition comprising the steps of mixing a powdery dye with a blinding agent, converting the mixture to granular form, and coating the dye granules thus formed with a monosaccharide, an oligosaccharide or a hydroxypropyl cellulose.

4. The process according to claim 3 wherein the coating agent containing the monosaccharide, the oligosaccharide or the hydroxypropyl cellulose is sprayed onto the dye granules while blowing hot air at a temperature between 40° to 100° C.

5. The process according to claim 3 wherein the powdery dye is mixed with an aqueous binder solution to obtain amixture and the mixture is dried and converted to the dye granules of predetermined size and shape.

6. The process according to claim 4 wherein the size of the dye granules lies in the range between 0.2 to 5 mm and 100 parts by weight of the dye granules are coated with 0.1 to 5 parts by weight of the monosaccharide, the oligosaccharide or the hydroxypropyl cellulose.

* * * * *